PRODUCTION OF DIAMINO-ANTHRAQUINONYL-OXDIAZOLES

Heinz-Werner Schwechten, Leverkusen-Bayerwerk, Germany, assignor to Farbenfabriken Bayer Aktiengesellschaft, Leverkusen, Germany, a corporation of Germany No Drawing. Application April 30, 1953, Serial No. 352,299

Claims priority, application Germany May 7, 1952

5 Claims. (Cl. 260—307.5)

The present invention relates to a process of producing diamino-anthraquinonyl-oxdiazoles.

It is known (see German Patent 825,111, Example 5) to produce 2.5-bis-(1'.4'-diamino-2'-anthraquinonyl)-1.3.4-oxdiazole by reducing the nitro compound of the formula

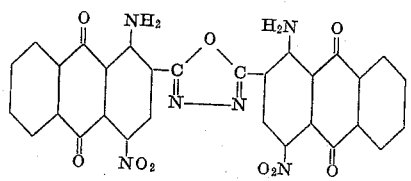

This nitro compound is prepared from 1-amino-4-nitro-anthraquinone-2-carboxylic acid chloride according to said German patent.

I have now found that, quite generally, 2-(1'.4'-diamino-2'-anthraquinonyl)-1.3.4-oxdiazoles can be obtained by nitration of compounds of the general formula

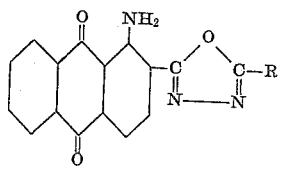

in which R means an organic radical, preferably a vattable radical or a group containing a vattable radical, for instance a phenyl radical which may be substituted by vattable radicals, with concentrated nitric acid, preferably such of 45° Bé., at temperatures up to about 100° C. and reduction in known manner. The nitro group enters the 4'-position of the anthraquinone radical upon nitrating; partial nitramine formation in 1'-position may take place at the same time. The nitro group and the nitramine group are converted into amino groups by the reduction. The process of the invention is essentially more simple and more convenient than that described in German Patent 825,111.

The 2-(1'.4'-diamino-2'-anthraquinonyl)-1.3.4-oxdiazoles obtained according to the invention are valuable intermediates in the production of chlorine resistant blue to grey vat dyestuffs formed by acylating the 4'-amino group, preferably with aromatic carboxylic acid radicals. As acylating agent, benzoyl chloride which may be substituted by halogen, alkoxy-, alkyl-groups etc. may be used. The invention is further illustrated by the following example without being restricted thereto; the parts being by weight.

Example 30 parts of the most finely ground and sifted dyestuff of the formula

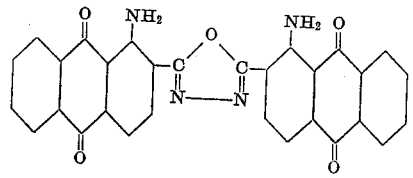

(see German Patent 825,111, Example 4) are introduced while stirring and cooling with ice water into 330 parts of nitric acid (45° Bé.) which had been separated from nitrous acid by stirring with 6 parts of urea. The temperature is raised to 35-40° C. and the mixture stirred at this temperature for one hour until the red dyestuff is completely converted into colorless needles of the nitramino-nitro compound. After cooling the nitramino-nitro compound is filtered with suction and the filtrate washed with nitric acid (specific gravity 1.4) and water. Due to the nitramino group the nitramino-nitro compound dissolves in a solution of pyridine and water with a brown-yellow coloration and precipitates unchanged from this solution upon addition of acids. The wet filtrate is reduced by heating it slowly with a solution of 60 parts of sodium sulfide in 300 parts of water to 90–100° C. with stirring and keeping the filtrate at this temperature for some time. After this the reduction product is filtered with suction, washed with hot water and dried. The blue diamino compound thus obtained corresponds to the formula

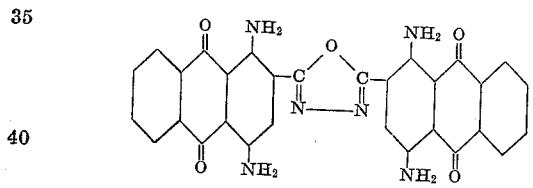

The compound, which can be crystallized from a larger quantity of quinoline, is purified by diluting the solution in concentrated sulfuric acid with water whereupon the compound precipitates in the form of a colorless crystallized sulfide. By acylating with benzoylchloride or its substitution products, chlorine-resistant blue vat dyestuffs are obtained.

In the same manner, the blue 4'.4''-diamino derivative is prepared from the scarlet compound of the formula

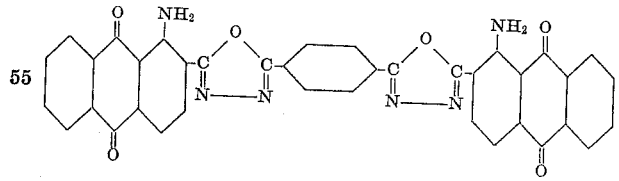

(see German Patent 825,111, Example 6). This derivative yields a chlorine fast and water repellent marine blue vat dyestuff upon benzoylating.

In the same manner, the blue 4'-amino derivative is produced from the red compound of the formula

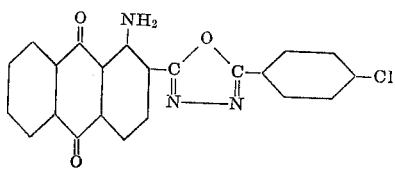

(see German Patent 825,111, Example 1) under the same conditions. This derivative, which crystallizes from nitrobenzene in blue leaflets, yields a clear reddish blue vat dyestuff upon benzoylating.

Furthermore, a green blue 4'.4"-diamino compound can be obtained from a compound of the formula

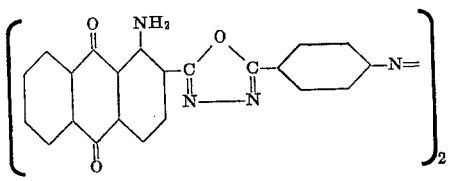

(prepared analogous to Example 7 of German Patent 825,111). This 4'.4"-diamino compound yields a grey vat dyestuff upon benzoylating.

I claim:

1. The process for the production of 2-(1'-nitramino-4'-nitro-2'-anthraquinonyl)-1.3.4-oxdiazoles which comprises nitrating 2-(1'-amino-2'-anthraquinonyl)-1.3.4-oxdiazoles with concentrated nitric acid.

2. The process which comprises nitrating 2.5-bis-(1'-amino-2'-anthraquinonyl)-1.3.4-oxdiazole with concentrated nitric acid to produce 2.5-bis-(1'-nitramino-4'-nitro-2'-anthraquinonyl)-1.3.4-oxdiazole.

3. The process which comprises nitrating 2-(1'-amino-2' - anthraquinonyl) - 5 - (p - chlorophenyl) - 1.3.4 - oxdiazole with concentrated nitric acid to produce 2-(1'-nitramino - 4' - nitro - 2' - anthraquinonyl - 5 - (p-chlorophenyl)-1.3.4-oxdiazole.

4. The process which comprises nitrating a compound of the formula

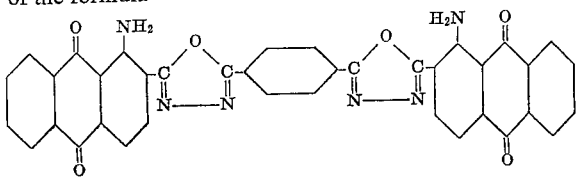

with concentrated nitric acid, to produce the bis-2'-nitramino-4'-nitro derivative.

5. The process which comprises nitrating a compound of the formula

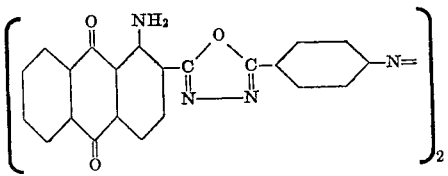

with concentrated nitric acid, to produce the bis-2'-nitramino-4'-nitro derivative.

References Cited in the file of this patent
UNITED STATES PATENTS

| | | |
|---|---|---|
| 2,511,018 | Stilmar | June 13, 1950 |
| 2,629,718 | Belshaw et al. | Feb. 24, 1953 |

FOREIGN PATENTS

| | | |
|---|---|---|
| 825,111 | Germany | Dec. 17, 1951 |

OTHER REFERENCES

Wiley: Chem. Reviews, vol. 37, pp. 429–30 (1945).
Lauer: Chem. Abstracts, vol. 27, p. 1628 (1933).